April 15, 1969 J. L. MASSEY 3,439,334
PROCESSING SIGNAL INFORMATION
Original Filed Aug. 2, 1963
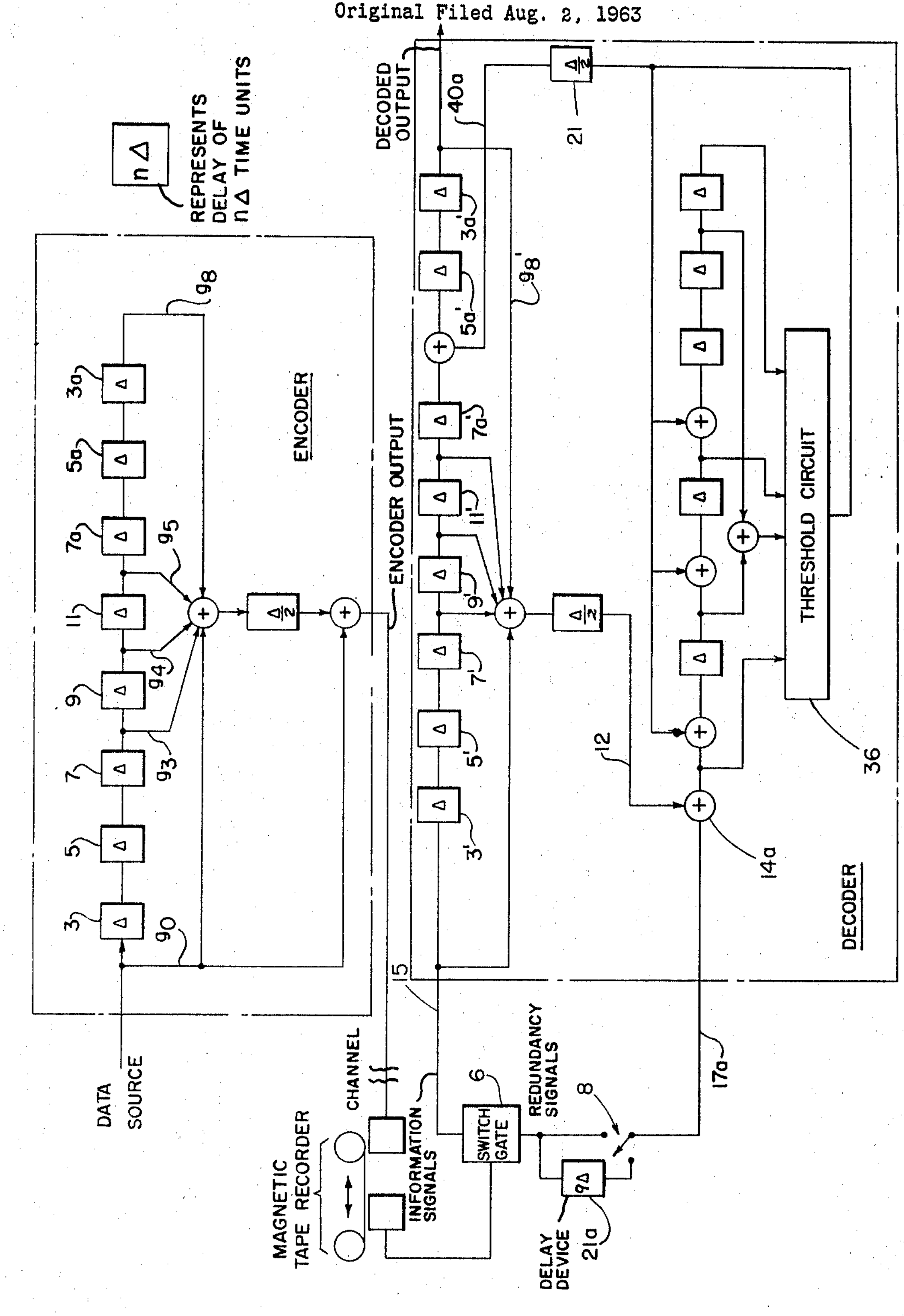

United States Patent Office 3,439,334
Patented Apr. 15, 1969

3,439,334
PROCESSING SIGNAL INFORMATION

James Lee Massey, South Bend, Ind., assignor to Codex Corporation, Watertown, Mass., a corporation of Delaware Original application Aug. 2, 1963, Ser. No. 299,534, Divided and this application Oct. 16, 1967, Ser. No. 675,633
Int. Cl. G08b *29/00*
U.S. Cl. 340—146.1 8 Claims

ABSTRACT OF THE DISCLOSURE

Device for correcting or detecting errors in transmission of signal information, having an information signal memory, an adder for forming redundancy signals from connections between the adder and the memory in accordance with a convolutional code, the device constructed to enable backward or forward decoding of the message.

This application is a division of copending application Ser. No. 299,534, filed Aug. 2, 1963, which in turn was a continuation-in-part of application Ser. No. 212,312, filed July 25, 1962 and now matured into Patent No. 3,303,333.

This application relates to the correcting or detecting of signal errors or other changes produced in transmission of signal information.

Objects of the invention include provision of a system enabling backward as well as forward decoding of a message encoded by an error correcting code.

The invention features an information signal memory having a multiplicity of stages through which information signals progress, a modulo 2 adder for forming redundancy signals from the information signals according to a convolutional code, and connections between the memory and the adder arranged to make the redundancy signals reciprocal with respect to the information signals. In preferred embodiments the information and redundancy signals are received by a decoder at staggered time units along input lines in one direction, and a delay is employed in the redundancy signal input line to be employed during backward decoding to displace the redundancy signals with respect to the information signals into the relationship they hold in the forward direction; and during encoding a sequence of zeros having a length substantially that of the memory is applied at the end of the stream of information signals.

Other objects, features, and advantages of the invention will be apparent from the following description of a preferred embodiment thereof, taken together with the drawing showing a block diagram of a forward-backward decoder according to the invention.

Encoding and decoding apparatus of the general type under consideration is disclosed in detail in U.S. Patent No. 3,303,333, and application Ser. No. 299,534 which are incorporated herein by reference.

Decoding of encoded digital messages that have been communicated by radio or wire is ordinarily performed adequately by proceeding in sequence from the initial information signal (i.e. in the "forward" direction).

According to the invention it has been realized, however, that in decoding from a magnetic tape where the tape must sometimes be moved forward and sometimes backward to find the encoded message or in decoding data that has been stored in other storage media, an important saving in rewind time can be achieved if the message is decoded in reverse sequence or "backwards" from the tape when the message is found ahead of the decoder or an important savings in access time can be achieved if only a small portion of the data near one end of the data block is needed. It has further been realized that such backward decoding of systematic convolutional codes can be possible by modifying the encoder and decoder apparatus to make the devices that form the redundancy signals reciprocal, ordinarily at the expense of adding some extra stages to the memory of these devices, and, as needed, introducing delay to achieve the same synchronization between the information signals and redundancy signals when proceeding backward as is obtained when proceeding forward. It still remains possible for the information and redundancy signals to be serialized, i.e. interleaved in a single digital stream, as is ordinarily desired.

In the case of convolutional codes every redundancy signal forming device, or equivalently, the code generating polynomial that defines the structure of such devices $$(G=g_0+g_1D^1+g_2D^2+g_3D^3+ \ldots g_mD^m)$$

can be made reciprocal, it being necessary only to increase the length of the memory and to add additional $g=1$ connections thereto so that every $g=1$ connection that is spaced to the left of the center of the memory has a mating $g=1$ spaced the same number of units to the right. From this it is apparent that to be made reciprocal no more than $m$ additional memory stages are needed to make any redundancy signal forming device reciprocal. Actually, many efficient codes will be found where only a few extra, if any memory stages will be required. (It will be understood that the term "reciprocal with respect to the information signals" as used herein refers to the symmetrical arrangement of the tap positions to the information memory. Mathematically an $m$ degree polynomial $$g(D)=g_0+g_1D+ \ldots +g_mD^m$$

is reciprocal if $g_{m-i}=g_i$ for all $i$. For the preferred embodiments, which employ binary codes, the only two possible values of the $g$ factors are zero and one, hence according to the above rule if $g_i$ equals one or zero, $g_{m-i}$ must equal one or zero, respectively, to achieve the benefits of this aspect of the invention. Note that in the case of a coding device having an odd number of positions, the center tap is denoted by $m/2$, that is $i=m/2$, and $$m-i=m-\frac{m}{2}=\frac{m}{2}\Big)$$

Referring to the figure in the encoder, five memory stages 3, 5, 7, 9, and 11 are provided, with $g=1$ connections at $g_0$, $g_3$, $g_4$, and $g_5$ according to the particular code generating polynomial being employed. Additional memory stages 7*a*, 5*a*, and 3*a*, and a further $g=1$ connection at $g_8$ are added to make the $g=1$ connections symmetrical about the center $g_4$.

The coded message is received by magnetic tape recorder 13 and the signals are eventually applied in either the forward or backward direction to switching gate 6. The information signals are fed along line 15 to memory stages 3', 5' . . . 3*a'* having $g=1$ connections corresponding to those in the encoder, so that simulated redundancy signals are produced.

Since the redundancy signals follow the information signals when received at gate 6, to decode the message backwards it is necessary to provide delay device 21*a* at the decoder redundancy input line 17*a* so that when decoding backward the final redundancy signal (the first one to reach the decoder when decoding backward) will immediately follow the final information signal. Switch 8 is provided for bypassing delay device 21*a* during forward decoding.

The redundancy signals are combined in adder 14*a* with the simulated redundancy signals from line 12 to produce the sequence of parity checks on the basis of which threshold circuit 36 eventually makes decisions as to transmission errors.

It should be noted that the last redundancy signal can contain a signal affected only by the final information signal through $g_8$ simply by causing a stream of zeros to enter the encoder at the end of the message, and operating the encoder until the last information signal has entirely traversed it.

Operating in either direction decoding of each information signal is carried out by parity checks formed from using the first six redundancy signals to arrive at the decoder. At the decoder the error in the information signal, if any, is added out by reset line 40$a$ through single unit delay 21 before reaching final stage 3$a$ so it is not present on the input $g_8'$ to the parity checks.

It will be apparent that while the invention is very efficiently instrumented by the threshold decoder, it is not limited thereto, but can be employed with any decoder that operates on a convolutional code.

Other embodiments will occur to those skilled in the art and are within the following claims.

What is claimed is:

1. In a convolutional code decoding system including an encoder and a decoder, said encoder having an information signal memory means that has a multiplicity of memory stages connected in sequence through which said information signals serially pass and a modulo 2 adder means for forming redundancy signals from information signals appearing on a plurality of connections between said memory means and said modulo 2 adder means, and said decoder having logic circuitry for decoding noisy received data from the encoded signals, wherein the improvement comprises said connections between said memory means and said modulo 2 adder means at the encoder positioned to make said redundancy signals reciprocal with respect to said information signals, and means at said decoder for supplying information and redundancy signals to the input of said decoder alternatively in the forward sequence corresponding to the direction of encoding and in the reverse ordered sequence to enable backward and forward decoding.

2. The decoding system of claim 1 wherein the improvement further comprises a delay means for the redundancy signal input line to the decoder, said delay means constructed to delay the received redundancy signals with respect to said information signals when decoding at least in one direction to obtain the timing relationship between respective information and redundancy signals reverse to the timing relation between said respective signals when decoding in the reverse direction.

3. The decoding system of claim 1 wherein the improvement further comprises said plurality of connections consisting of at least three connections.

4. The decoding system of claim 1 wherein the improvement further comprises decoder logic circuitry, for the decoding of each information bit, for forming a set of at least four syndrome signals orthogonal upon the information bit being decoded, and threshold logic circuitry constructed to determine the correction for said information bit from said set of syndrome signals.

5. The decoding system of claim 1 wherein the improvement further comprises means for applying to said encoder memory means, at the end of the stream of information signals applied to said memory means, a sequence of zeros having a length substantially equal to that of said memory means.

6. In a convolutional code decoding system including an encoder and a decoder, said encoder having an information signal memory means that has a multiplicity of memory stages connected in sequence through which said information signals serially pass, and a modulo 2 adder means for forming redundancy signals from said information signals appearing on a plurality of connections between said memory means and said modulo 2 adder means, and said decoder having logic circuitry for decoding noisy received data from the encoded signals, said logic circuitry including a memory for received signals, and connections to said memory corresponding to said connections to said memory of said encoder, wherein the improvement comprises a first group of adjacent memory stages and connections thereto of said encoder memory which define the convolutional coding polynomial that determines the error-correcting capability of the code, said polynomial not being reciprocal, additional memory stages numbering no more than said first group connected to one end of said first group of stages, and additional connections between selected additional memory stages and said modulo 2 adder to make redundancy signals formed by said modulo 2 adder means reciprocal with respect to said information signals, said decoder logic circuitry adapted to produce a sequence of correction signals for information signals in said memory of said decoder and adder means for adding said correction signals to corresponding information signals in said decoder memory, said adder means disposed in said memory preceding at least the last connection of said decoder logic circuit memory to cause the original errors of information signals not to enter the decoding logic along said connection, to enable backward and forward decoding.

7. A data retrieval system comprising a backward and forward moving storage member storing a sequence of digital binary signals encoded by a convolutional error correction code, a read-out device for said signals, and an error correction decoder adapted to decode said encoded signals for producing data substantially free from errors, wherein said decoder is adapted to decode a convolutional code that is reciprocal, said decoder for its parity decoding logic having a memory and a set of connections to said memory in which every connection on one side of a central point corresponds in time unit spacing from said central point to a connection on the other side of said central point, and said decoder constructed to decode said sequence while said storage member moves both forward and backward.

8. In a convolutional code decoder for use with an encoder, said decoder having a received information signal memory means that has a multiplicity of memory stages connected in sequence through which received information signals serially pass, and a modulo 2 adder means for forming syndrome bit signals from received redundancy signals and information signals appearing on a plurality of connections between said memory means and said modulo 2 adder means, said decoder also having decision circuitry for decoding noisy received data from the encoded signals on the basis of said syndrome bit signals, wherein the improvement comprises means for supplying information and redundancy signals to the input of said decoder alternatively in the forward sequence corresponding to the direction of encoding and in the reverse ordered sequence and a delay means for the redundancy input line of said decoder, said delay means constructed to delay the received redundancy signals with respect to said information signals when decoding at least in one direction to obtain the timing relationship between respective information and redundancy signals reverse to the timing relation between said respective signals when decoding in the reverse direction.

References Cited

UNITED STATES PATENTS 3,162,837 12/1964 Meggitt ---------- 340—146.1

MALCOLM A. MORRISON, *Primary Examiner.*

C. E. ATKINSON, *Assistant Examiner.*

U.S. Cl. X.R.

235—153